(12) United States Patent
Matsumoto

(10) Patent No.: US 6,524,438 B2
(45) Date of Patent: Feb. 25, 2003

(54) METHOD FOR MAKING PREFORMS

(75) Inventor: Roger Lee Ken Matsumoto, Newark, DE (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/853,230

(22) Filed: May 11, 2001

(65) Prior Publication Data

US 2002/0047227 A1 Apr. 25, 2002

Related U.S. Application Data

(63) Continuation-in-part of application No. 09/611,735, filed on Jul. 7, 2000, now abandoned.

(51) Int. Cl.⁷ .......................... D21H 13/50; D21H 17/67
(52) U.S. Cl. .................... 162/145; 162/152; 162/157.1; 162/158; 162/164.1; 162/164.3; 162/164.6; 162/168; 162/183
(58) Field of Search ................................ 162/145, 146, 162/183, 218, 228, 158, 164.1, 168.1, 164.3, 164.6

(56) References Cited

U.S. PATENT DOCUMENTS

| | | |
|---|---|---|
| 4,297,307 A | 10/1981 | Taylor |
| 4,457,967 A | 7/1984 | Chareire et al. |
| 4,569,920 A | 2/1986 | Smith-Johannsen |
| 4,775,705 A | 10/1988 | Parker et al. |
| 4,818,448 A | 4/1989 | Wrenn, Jr. et al. |
| 4,921,658 A | 5/1990 | Pennington .................. 264/86 |
| 5,147,588 A | 9/1992 | Okura et al. |
| 5,190,991 A | 3/1993 | Parker et al. |
| 5,398,784 A | 3/1995 | Haneda et al. |
| 5,439,080 A | 8/1995 | Haneda et al. |
| 5,472,995 A | 12/1995 | Kaminski et al. |
| 5,744,075 A | 4/1998 | Klett et al. |
| 5,817,216 A | * 10/1998 | Tomita et al. .............. 162/218 |
| 5,889,082 A | 3/1999 | Kaminski et al. |
| 5,906,712 A | 5/1999 | Asami et al. |

FOREIGN PATENT DOCUMENTS

EP   0 421 418 A   4/1991   ........... C04B/35/80

OTHER PUBLICATIONS

Kirk–Othmer, "Flocculating Agents", Encyclopedia of Chemical Technology, vol. 11, pp. 61–80 (1994).
Patent Abstracts of Japan, vol. 013, No. 179 (C–590), Apr. 26 1989 & JP 01 008232A (Tokai Carbon Co. Ltd.) Jan. 12 1989.

* cited by examiner

*Primary Examiner*—Peter Chin
(74) *Attorney, Agent, or Firm*—Larry J. Palguta

(57) ABSTRACT

A method for manufacturing a preform having a desirably uniform distribution of structural forms (for example and without limitation, particles, flakes, and fibers) therethrough. The method according to the present invention includes using an electrical charge reaction between cationic and anionic agents (such as, without limitation, cationic and anionic polymers) to cause the structural forms to floc or clump together in a mass in which the structural forms are desirably uniformly distributed therethrough. The flocculent mass is then dewatered and/or dried to form a preform that is ready for further processing.

16 Claims, No Drawings

METHOD FOR MAKING PREFORMS

RELATED APPLICATION

This application is a continuation-in-part of application Ser. No. 09/611,735 filed on Jul. 7, 2000, now abandoned the entire contents of which are hereby incorporated by reference.

FIELD OF THE INVENTION

The present invention relates to a method for making a preform for use in a friction brake.

DESCRIPTION OF RELATED ART

Carbon brakes are conventionally manufactured by pressing preforms into required shapes. The preforms are made from a combination of structural forms, such as particles or powders, short fibers, and flakes. Some or all of the structural forms are carbon or carbon-based.

With conventional methods of manufacture, it has been difficult to maintain a uniform mixture or distribution of the structural forms throughout the preform. In general, the combination of different structural forms naturally tends to separate or "demix," especially when the structural forms are dry-blended.

One conventional solution to the demixing problem is to create a wet slurry of the structural forms. However, when the slurry is dewatered (using, for example, a screen), the particulate elements tend to be lost through the screen as the water drains. This leaves a non-uniform distribution of the structural forms. On the other hand, filtering the slurry will retain the fine particulate elements, but it results in increased processing times and non-uniform distribution of the structural forms.

Klett, U.S. Pat. No. 5,744,075, discloses a slurry-based method of making a densified carbon matrix carbon fiber composite preform which comprises the use of a rigidizer—such as paraffin wax, polyethylene glycol, and mixtures thereof—and a vacuum molding step.

Other conventional methods, such as spray drying, do not work well with a mixture containing fiber elements.

Flocculation is a known process by which fine particles, suspended in a liquid, form an aggregate or a clumped mass. A principal conventional use of flocculation is to aid in making solid-liquid separations, such as: removing suspended matter in drinking water; separating solid material in municipal or industrial wastewater to obtain low-volume, dewatered sludge; removing suspending inorganic material from waste streams; separating solid and liquid phases in leaching operations, where a valuable material is contained in the liquid phase, thereby facilitating recovery; and binding fine cellulose fibers and inorganic additives to long cellulose fibers as paper pulp is formed into thin sheets. See generally Kirk-Othmer, *Encyclopedia of Chemical Technology*, Vol. 11, 4th Ed., John Wiley & Sons, 1994, pp. 61–80, and especially, p. 62. See also Asami, U.S. Pat. No. 5,906,712, which discloses a flocculation process involving latex, for making paper-thin composite sheets.

SUMMARY OF THE INVENTION

It is desirable to provide a method for manufacturing a preform that encourages a uniform distribution of structural forms (for example, without limitation, particles, powders, short fibers, or flakes) throughout the preform so as to avoid demixing. The present invention therefore uses flocculation of the structural forms constituting the preform in order to prevent demixing.

A method according to the present invention includes forming a slurry using a material including a plurality of structural forms, including, for example and without limitation, fibers, particles, and flakes. Either a cationic material or an anionic material is initially dispersed in the slurry so as to coat the structural forms of the material. Thereafter, an anionic material or a cationic material (i.e., the opposite of the material used to coat the structural forms of the material) is dispersed into the slurry having the coated structural forms, thereby causing flocculation of the structural forms in the slurry in a known manner. Finally, the flocced slurry is dewatered, shaped, and dried to obtain a desired preform.

It must be noted that the present invention lies, most generally, in the use of the flocculation phenomenon to ensure a uniform distribution of structural forms in the preform.

DESCRIPTION OF PREFERRED EMBODIMENTS

As indicated above, the present invention relates to manufacturing a preform for friction elements that, in pertinent part, uses flocculation to provide a uniform distribution of the structural forms constituting the preform. Accordingly, the present invention is applicable to a wide variety of material combinations and structural form combinations.

Generally, the material or materials that are to be consolidated into a preform are slurried. Water is a suitable vehicle for making the slurry. Each material characteristically includes at least two different structural forms, including, for example and without limitation, particles of various sizes, fibers, and flakes in accordance with the respective material or materials used.

As mentioned above, one or more materials can be mixed to form the slurry. In one example, sintered carbon is used, comprising carbon powder particles and some short carbon fibers. In another example, carbon fibers, silicon carbide, and phenolic powder is mixed. The short fibers may be, for example, chopped or milled to form fibers of the appropriate length.

The cationic and anionic materials are, preferably (but not necessarily), cationic and anionic polymers. In one example in accordance with the present invention, a cationic polymer (such as that commercially available under the tradename "Kymene 557H" available from the Hercules Co.) is dispersed in the slurry of the material or materials to coat the structural forms in the slurry. Thereafter, an anionic polymer (such as that commercially available under the tradename "Reten 235" from the Hercules Co.) is dispersed in the slurry containing the structural forms coated with cationic polymer.

The electric charge interaction between the cationic polymer coating the structural forms in the slurry and the anionic polymer subsequently dispersed in the slurry causes the structural forms to floc or clump together in a mass having a desirably uniform distribution of structural forms throughout. The flocced mass is then dewatered and shaped in a form. The dewatered mass is then dried to obtain the desired preform (which is ready for a subsequent pressing operation). If desired, the dewatering and shaping can be carried out simultaneously in a form having a screen.

The form is preferably shaped to provide a preform having a desired shape, such as a block or a right cylinder.

The flocculation phenomenon that occurs with the use of cationic and anionic materials in general occurs regardless of which is used first and which is used subsequently. However, specific cationic materials and anionic materials may have a unique behavior relative to each other such that one or the other must be used first relative to a counterpart material used second.

The amounts of cationic and anionic materials that are necessary to bring about flocculation depends on the amount of the constituent material or materials present. It is desirable to use the smallest effective amounts of the cationic and anionic materials so as to reduce the usage of those materials and thereby reduce processing costs.

A preferred method for making a preform in accordance with this invention comprises: forming a slurry including particulate materials having a plurality of structural forms, one of which is carbon fibers; dispersing a cationic material into the slurry so as to substantially coat the plurality of structural forms with the cationic material; dispersing an anionic material into the slurry having the coated structural forms therein so as to cause the coated structural forms to flocculate; and drying the flocced slurry in a form to obtain a preform. In this embodiment, fibers will constitute 1–90 weight-%, preferably 1–50 weight-%, of the particulate materials and powders will constitute 10–99 weight-%, preferably 50–99 weight-%, of the particulate materials. The amount of cationic material used will constitute 5–25 weight-%, based on the total weight of the particulate materials. The anionic material used will be constituted as a 0.0–1.0% solution, employed at a rate of 1 to 5 liters per kilogram of particulate material.

EXAMPLES

Example 1

50.0 grams of 0.25" chopped PAN fiber (a carbonized polyacrylonitrile fiber obtained from Fortafil Fibers, Inc. of Rockwood, Tenn.) were dispersed in 9 liters of deionized water, 105.0 grams of ground stabilized AR pitch (a polycondensed naphthalene pitch obtained from Mitsubishi Gas Chemical America, Inc. of New York, N.Y.) were added and dispersed, and 45.0 grams of ground AR pitch were added and dispersed. 50.0 grams of Kymene 557H polymer (a cationic wet-strength resin obtained from Hercules Inc. of Wilmington, Del.) were added to coat all solids in the slurry. 2.5 liters of a 0.1% solution of Reten 235 (an anionic retention aid obtained from Hercules Inc. of Wilmington, Del.) were added to flocculate all of the solids. The flocculated material was screened to yield a cake 8" diameter by 0.78" thick.

Example 2

44.0 grams of chopped PAN fiber (0.25"), 44.0 grams of milled PAN fiber, 136.0 grams of ground stabilized AR pitch, and 76.0 grams of ground AR pitch were dispersed in 15 liters of deionized water. 91 grams of Kymene 557H were added to the mixture to coat all solids. 3 liters of a 0.1% Reten 235 solution were added to flocculate all solids together. The flocculated mass was screened in a 5" diameter mold to form a cylindrical puck 2.75" thick.

Example 3

75.0 grams of chopped PAN fiber (0.25"), 157.5 grams of ground coke (9 carbon, obtained from Superior Graphite Co. of Chicago, Ill.), and 67.5 grams of ground AR pitch were dispersed in 12 liters of deionized water. 48.8 grams of Kymene 557H were added to coat all solids. 0.75 liters of a 0.4% Reten 235 solution were added to flocculate all solids together. The flocculated mass was screened in a 5" diameter mold to form a cylindrical puck 3.125" thick.

Example 4

1000 grams of chopped PAN fiber (0.25"), 2100 grams of ground coke, and 900 grams of ground AR pitch were dispersed in 35 gallons of deionized water. 425 grams of Kymene 557H were added to coat all solids in the mix. 10 liters of 0.4% Reten 235 solution were added to flocculate all solids together. The flocculated mass was screened in a form to yield a large puck with a central hole (1 8.4" overall diameter with a 10.7" hole) that was 6.5" tall.

Example 5

1000 grams of chopped PAN fiber (0.25"), 2100 grams of ground stabilized AR pitch, and 900 grams of ground AR pitch were dispersed in 35 gallons water. 475 grams of Kymene 557H were added to the mixture to coat all solids. 10 liters of 0.4% Reten 235 solution were added to flocculate all solids together. The flocculated mass was then screened in a form to yield a large puck with a central hole (15.5" overall diameter with a 7.75" hole). Once the water had drained, the mass was compressed during drying to yield a thickness of 3".

Example 6

100.0 grams of chopped PAN fiber (1.0"), 210.0 grams of ground stabilized AR pitch, 90.0 grams of ground phenolic powder (Plenco 12114, obtained from Rutgers-Plenco, LLC. Of Sheboygan, Wis.) were dispersed in 12 liters of deionized water. 48 grams of Kymene 557H were added to the mixture to coat all solids. 1.0 liter of 0.4% Reten 235 solution was added to flocculate the solids. The flocculated solids were screened in a 5" diameter mold to a thickness of 8".

Example 7

900 grams of chopped PAN fiber (1.0"), 1890 grams of ground stabilized AR pitch, and 810 grams of ground AR pitch were dispersed in 35 gallons water. 750 grams of Kymene 557H were added to the mixture to coat the solids. 3 gallons of 0.4% Reten 235 solution were added to flocculate all solids together. The flocculated solids were screened in a mold to yield a large puck with a central hole (17.0" overall diameter with a 9.5" hole). Once the water drained, the mass was compressed during drying at 100° C. to yield a thickness of 4".

Example 8

150 grams of chopped PAN fiber (0.25"), 90 grams of silicon carbide (FEPA 1200 grit, obtained from St. Gobain Industrial Ceramics of Worcester, Mass.), 10.0 grams of boron carbide (Grade HP, obtained from H.C.Starck Inc. of Newton, Mass.), and 250 grams of Durite phenolic powder (RD2475, obtained from Borden Chemicals, Inc. of Louisville, Ky.) were dispersed in 12 liters of deionized water. 25 grams of Kymene 557H were added to the mixture to coat all solids. 150 ml of a 0.4% Reten 235 solution were added to flocculate the solids together. The flocculated solids were screened in a 5" diameter form and dried at 70° C. The dried thickness was 10".

Comparative Example 1

In Example 13 of the Asami patent, 5 grams of a polyaniline powder, 0.5 grams of polyester fibers, and 0.1 grams of an anionic polymer were mixed in 2 liters of water. The slurry was flocculated with a cationic solution containing 0.1 grams in 30 grams of water of a water soluble organic polymer. The flocculated slurry was dewatered and shaped into a mat by a sheet machine. The wet mat was dewatered, dried, and pressed to obtain an electroconductive sheet having a thickness of 0.8 mm.

Comparative Example 2

In Column 4 of the Klett patent, PAN fibers are incorporated into slurries with powders and rigidizers, and the slurries are vacuum molded. It is believed that vacuum molding (unlike flocculation) adversely affects the uniformity of distribution of particulates in this process.

What is claimed is:

1. A method for making a preform, comprising:
   forming a slurry including materials having a plurality of structural forms, one of which is carbon fibers and another of which is a powder selected from the group consisting of pitch, coke, and silicon carbide;
   dispersing a cationic material into the slurry so as to substantially coat the plurality of structural forms with the cationic material;
   dispersing an anionic material into the slurry having the coated structural forms therein so as to cause the coated structural forms to flocculate; and
   drying the flocced slurry in a shaped form to obtain a preform.

2. The method of claim 1, wherein the structural forms comprise particles, flakes, and fibers.

3. The method of claim 1, wherein the form is shaped to provide a preform block.

4. The method of claim 1, wherein the form is shaped to provide a cylindrical preform having a thickness of 2.75 inches or 3.125 inches.

5. The method of claim 1, wherein dispersing the cationic material comprises dispersing a cationic polymer.

6. The method of claim 1, wherein dispersing the anionic material comprises dispersing an anionic polymer.

7. The method of claim 1, wherein drying the flocced slurry includes dewatering the flocced slurry.

8. A method for making a preform, comprising:
   forming a slurry including materials having a plurality of structural forms, one of which is carbon fibers and another of which is a powder selected from the group consisting of pitch, coke, and silicon carbide;
   dispersing an anionic material into the slurry so as to substantially coat the plurality of structural forms with the anionic material;
   dispersing a cationic material into the slurry having the coated structural forms therein so as to cause the coated structural forms to flocculate; and
   drying the flocced slurry in a shaped form to obtain a preform.

9. The method of claim 8, wherein the structural forms comprise particles, flakes, and fibers.

10. The method of claim 8, wherein the form is shaped to provide a preform block.

11. The method of claim 8, wherein the form is shaped to provide a cylindrical preform having a thickness of 2.75 inches or 3.125 inches.

12. The method of claim 8, wherein dispersing the anionic material comprises dispersing an anionic polymer.

13. The method of claim 8, wherein dispersing the cationic material comprises dispersing a cationic polymer.

14. The method of claim 8, wherein drying the flocced slurry includes dewatering the flocced slurry.

15. A method for making a preform for use in the manufacture of a friction brake, comprising:
   forming a slurry including materials having a plurality of structural forms, one of which is carbon fibers and another of which is a powder selected from the group consisting of pitch, coke, and silicon carbide;
   dispersing a cationic material into the slurry so as to substantially coat the plurality of structural forms with the cationic material;
   dispersing an anionic material into the slurry having the coated structural forms therein so as to cause the coated structural forms to flocculate; and
   drying the flocced slurry in a form having the shape of a block or a right cylinder to obtain a preform.

16. A method for making a preform for use in the manufacture of a friction brake, comprising:
   forming a slurry including materials having a plurality of structural forms, one of which is carbon fibers and another of which is a powder selected from the group consisting of pitch, coke, and silicon carbide;
   dispersing an anionic material into the slurry so as to substantially coat the plurality of structural forms with the anionic material;
   dispersing a cationic material into the slurry having the coated structural forms therein so as to cause the coated structural forms to flocculate; and
   drying the flocced slurry in a form having the shape of a block or a right cylinder to obtain a preform.

* * * * *